(12) United States Patent
Nakai

(10) Patent No.: US 6,829,093 B1
(45) Date of Patent: Dec. 7, 2004

(54) DIFFRACTION OPTICAL ELEMENT

(75) Inventor: Takehiko Nakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/626,738

(22) Filed: Jul. 26, 2000

(30) Foreign Application Priority Data

Jul. 28, 1999 (JP) .......................................... 11-213374

(51) Int. Cl.[7] ................................................ G02B 5/18
(52) U.S. Cl. ...................................... 359/576; 359/570
(58) Field of Search ................................ 359/565, 576, 359/569, 570

(56) References Cited

U.S. PATENT DOCUMENTS

| | | | | |
|---|---|---|---|---|
| 4,210,391 A | * | 7/1980 | Cohen ........................ | 351/161 |
| 5,044,706 A | | 9/1991 | Chen .......................... | 359/357 |
| 5,076,684 A | | 12/1991 | Simpson et al. ............ | 351/168 |
| 5,737,113 A | | 4/1998 | Kuramochi et al. ........ | 359/259 |
| 5,790,321 A | | 8/1998 | Goto .......................... | 359/742 |
| 5,995,279 A | * | 11/1999 | Ogino et al. ............... | 359/355 |
| 6,122,104 A | | 9/2000 | Nakai ......................... | 359/576 |
| 6,157,488 A | * | 12/2000 | Ishii ........................... | 359/569 |
| 6,262,846 B1 | | 7/2001 | Nakai ......................... | 359/576 |
| 6,624,943 B2 | | 9/2003 | Nakai et al. ................ | 359/569 |
| 2001/0036012 A1 | | 11/2001 | Nakai et al. ................ | 359/569 |

FOREIGN PATENT DOCUMENTS

| | | |
|---|---|---|
| EP | 0 902 304 | 3/1999 |
| EP | 0 965 864 | 12/1999 |
| JP | 04-213421 | 8/1992 |
| JP | 06-324262 | 11/1994 |
| JP | 09-127322 | 5/1997 |
| JP | 10-133149 | 5/1998 |
| JP | 11-84118 | 3/1999 |

OTHER PUBLICATIONS

S. Ebstein, "Achromatic Diffractive Optical Elements", SPIE vol. 2404, pp. 211–216, (1995).

* cited by examiner

Primary Examiner—Mark A. Robinson
Assistant Examiner—Alessandro Amari
(74) Attorney, Agent, or Firm—Fitzpatrick, Cella, Harper & Scinto

(57) ABSTRACT

A diffraction optical element wherein a plurality of diffraction gratings formed of at least two kinds of materials differing in dispersion are laminated, at least two of the plurality of diffraction gratings are formed on a curved surface and adjacent to each other, and these two adjacent diffraction gratings are equal to each other in the shape of a curved tip plane in which the tips of respective grating portions are ranged.

11 Claims, 11 Drawing Sheets

DIFFRACTION OPTICAL ELEMENT

BACKGROUND OF THE INVENTION

1. Field of the Invention

This invention relates to a diffraction optical element, and particularly to a diffraction optical element suitable for use in a light including a plurality of wavelengths, or a wide-band light, and an optical system using the same.

2. Related Background Art

In contrast with a conventional method of decreasing chromatic aberration by a combination of glass materials, a method of providing a diffraction optical element (hereinafter referred to also as the diffraction grating) having the diffracting action on a lens surface or a portion of an optical system to thereby decrease chromatic aberration is disclosed in literature such as SPIE, Vol. 1354, International Lens Design Conference (1990), Japanese Patent Application Laid-Open No. 4-213421, Japanese Patent Application Laid-Open No. 6-324262 and U.S. Pat. No. 5,044,706. This method utilizes the physical phenomenon that in a refracting surface and a diffracting surface in an optical system, chromatic aberration for rays of light of a certain reference wavelength appears in opposite directions. Further, such a diffraction optical element can also be given an effect like that of an aspherical lens by the period of the periodic structure thereof being changed, and has a great effect in reducing aberrations.

Here, in refraction, a ray of light is a ray of light still after refraction, whereas in diffraction, a ray of light is divided into a plurality of orders. So, when a diffraction optical element is used as a lens system, it is necessary to determine the grating structure so that a light beam of a wavelength area used may concentrate in a particular order (hereinafter referred to also as the "design order"). When a light concentrates in the particular order, the intensity of the other rays of diffracted light becomes low, and when the intensity is zero, the diffracted light thereof becomes null.

Therefore, when the aberrations of an optical system are to be corrected by a diffraction optical element, it becomes necessary to that element that the diffraction efficiency of a ray of light of the design order be sufficiently high in the entire wavelength area used. Also, when there are present rays of light having the other diffraction order than the design order, those rays of light are imaged at locations discrete from the location for the ray of light of the design order and therefore become flare light. Accordingly, in an optical system using the diffraction effect, it is important to give sufficient consideration also to the spectral distribution of the diffraction efficiency at the design order and the behavior of the rays of light of the other diffraction orders than the design order.

When a diffraction optical element 201 having a diffraction grating 204 comprising a layer provided on a substrate 202 as shown in FIG. 16 of the accompanying drawings is formed on a certain surface, the characteristic of diffraction efficiency for the particular diffraction order is shown in FIG. 17 of the accompanying drawings. Hereinafter, the value of the diffraction efficiency is the rate of the quantity of each diffracted light to the whole transmitted light beam, and is a value in which the reflected light or the like on the boundary surface of the diffraction grating is not taken into consideration because it is complex to describe. In FIG. 17, the axis of abscissas represents wavelength and the axis of ordinates represents diffraction efficiency. The diffraction optical element 201 is designed such that in the first diffraction order (solid line in the figure), the diffraction efficiency becomes highest for the wavelength area used. That is, the design order is the first order. Further, the diffraction efficiency for the diffraction orders in the vicinity of the design order (zero order and second order which are first order±one order) is also shown. At the design order, the diffraction efficiency becomes highest for a certain wavelength (hereinafter referred to as the "design wavelength") and gradually becomes lower for the other wavelengths. The decrement in the diffraction efficiency at this design order is the increment in the diffraction efficiency at the other orders than the design order, and diffracted lights of the other orders than the design order become flare lights. Also, when a plurality of diffraction optical elements are used, particularly a reduction in the diffraction efficiency at the other wavelengths than the design wavelength also leads to a reduction in transmittance.

A construction which can decrease such a reduction in the diffraction efficiency is disclosed in Japanese Patent Application Laid-Open No. 9-127322. This, as shown in FIG. 18 of the accompanying drawings, optimally selects three kinds of different materials and two kinds of different grating thicknesses, and disposes them in proximity at an equal pitch distribution to thereby realize high diffraction efficiency in the entire visible area, as shown in FIG. 19 of the accompanying drawings.

Also, the assignee of the application presents in Japanese Patent Application Laid-Open No. 10-133149 a diffraction optical element which can decrease any reduction in diffraction efficiency. FIG. 20 of the accompanying drawings shows the construction presented in the above-mentioned proposition, and it has a laminated cross-sectional shape in which two layers are stacked. High diffraction efficiency is realized by optimizing the refractive indices of materials forming the two layers, the spectral characteristic and the thickness of each grating.

If a diffraction optical element is provided in an optical system, light beams of various angles of views usually enter the diffraction optical element. Therefore, if a diffraction optical element having a diffraction grating provided on a flat plate is used in an optical system, the angle of incidence of a light beam onto the diffraction optical element is changed by the angles of view, and the diffraction efficiency of diffracted light at the design order comes to be changed by the angles of view.

In particular, a laminated diffraction optical element, as compared with the prior-art single-layer diffraction optical element shown in FIG. 16, tends to become greater in the thickness of the grating. Therefore, a laminated diffraction optical element formed on a flat plate, when used in an optical system having an angle of view, has its diffraction efficiency greatly reduced by the eclipse or the like of a light beam on the edge surface of the grating.

In contrast, it would occur to mind to use a diffraction optical element having a diffraction grating on a curved surface in an optical system having an angle of view. In this case, when the diffraction optical element is disposed, for example, more adjacent to the object side than a stop, a change in the angle of incidence of a light beam onto the diffraction optical element may be reduced depending on a change in the angle of view by the diffraction grating being provided on a curved surface which is concave relative to the stop.

Actually, however, unless the shape of the grating when a diffraction optical element having laminated structure is formed on a curved surface is made appropriate, high optical performance equal to that of a diffraction optical element of laminated structure formed on a flat surface will not be obtained in some cases.

SUMMARY OF THE INVENTION

The present invention has as its object the provision of a diffraction optical element which, even when used in an optical system having an angle of view, has a small change in diffraction efficiency depending on the angle of view, and an optical system using the same.

A first diffraction optical element of the present invention is a diffraction optical element having structure in which at least two diffraction gratings formed of at least two kinds of materials differing in dispersion are laminated, and having its diffraction efficiency of a particular order enhanced in the wavelength area used, characterized in that at least two of the diffraction gratings are formed on a curved surface and adjacent to each other, and these two adjacent diffraction gratings are of a curved surface shape in which curved tip planes in which the tips of respective grating portions are ranged are equal to each other.

A second diffraction optical element of the present invention is a diffraction optical element having structure in which at least two diffraction gratings formed of at least two kinds of materials differing in dispersion are laminated, and having its diffraction efficiency of a particular order enhanced in the wavelength area used, characterized in that at least two of the diffraction gratings are formed on a curved surface and adjacent to each other, and a curved tip plane in which the tips of the grating portion of one of these two adjacent diffraction gratings are ranged and a groove bottom curved surface in which the groove bottoms of the grating portion of the other diffraction grating are ranged are of an equal curved surface shape.

A third diffraction optical element of the present invention is a diffraction optical element having structure in which at least two diffraction gratings formed of at least two kinds of materials differing in dispersion are laminated, and having its diffraction efficiency of a particular order enhanced in the wavelength area used, characterized in that at least two of the diffraction gratings are formed on a curved surface and adjacent to each other, and these two adjacent diffraction gratings are such that a line linking the tips of the opposed grating portions thereof is substantially parallel to an optical axis.

A fourth diffraction optical element of the present invention is a diffraction optical element having structure in which a plurality of diffraction gratings formed of at least two kinds of materials differing in dispersion are laminated, and having its diffraction efficiency of a particular order enhanced in the wavelength area used, characterized in that two adjacent ones of the plurality of diffraction gratings satisfy $$\alpha \leq \beta$$

where $\beta$ represents the angle formed between the grating edge of the grating portion thereof and the grating surface of the grating portion, and $\alpha$ represents the angle formed by the grating surface with respect to the surface normal of a curved tip plane at a position whereat the curved tip plane in which the tips of the grating portion are ranged and the tips intersect with each other.

A fifth diffraction optical element of the present invention is a diffraction optical element having structure in which a plurality of diffraction gratings formed of at least two kinds of materials differing in dispersion are laminated, and having its diffraction efficiency of a particular order enhanced in the wavelength area used, characterized in that the grating thickness of the grating portions of the diffraction gratings is such that the length of the grating thickness in a direction parallel to the surface normal of a curved tip plane in which the tips of the grating portions are ranged at a position whereat the curved tip plane and the tips intersect with each other is constant.

A sixth diffraction optical element of the present invention is a diffraction optical element having structure in which at least two diffraction gratings formed of at least two kinds of materials differing in dispersion are laminated, whereby the diffraction efficiency of a particular order (design order) is enhanced in the entire wavelength area used, characterized in that at least two of the diffraction gratings are formed on a curved surface and adjacent to each other, and these two adjacent diffraction gratings are equal to each other in the center of curvature of the curved tip plane of each grating portion thereof in which the most proximate tips of the gratings are ranged.

A seventh diffraction optical element of the present invention is a diffraction optical element having laminated grating structure in which at least two diffraction gratings formed of at least two kinds of materials differing in dispersion are stacked in proximity to one another, and having its diffraction efficiency of a particular order enhanced in the wavelength area used, characterized in that two of the diffraction gratings are formed on a curved surface and adjacent to each other, and the grating spacing between these two adjacent diffraction gratings is equal over the range of use.

Each of the aforedescribed elements has a form in which the plurality of laminated diffraction gratings are joined together in the non-grating area of each diffraction grating.

Each of the aforedescribed elements has a form in which the plurality of laminated diffraction gratings include a diffraction grating differing in the direction of the grating shape from at least one other diffraction grating.

Each of the aforedescribed elements has a form in which the wavelength area used is a visible range.

Each of the aforedescribed elements has a form in which at least one of the plurality of diffraction gratings is such that the material forming the diffraction grating is the same as the material forming a substrate on which the diffraction gratings are provided.

Each of the aforedescribed elements has a form in which a substrate on which the diffraction gratings are formed has lens action.

Each of the aforedescribed elements has a form in which it is formed on the cemented surface of a cemented lens.

The optical system of the present invention is characterized in that it uses any one of the aforedescribed elements and the aforedescribed forms of diffraction optical element.

The optical system is an imaging optical system or an observation optical system.

DESCRIPTION OF THE PREFERRED EMBODIMENTS

Figure 1:
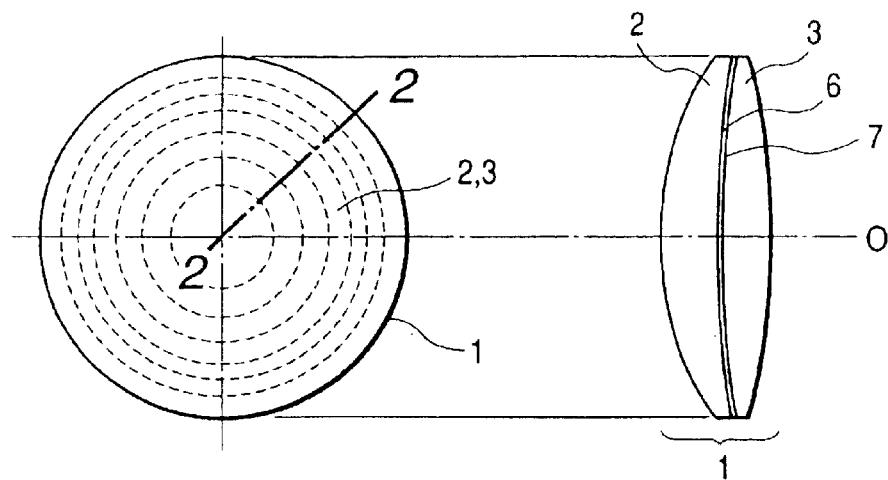
FIG. 1 is a schematic view of the essential portions of a diffraction optical element according to Embodiment 1 of the present invention.
Figure 2:
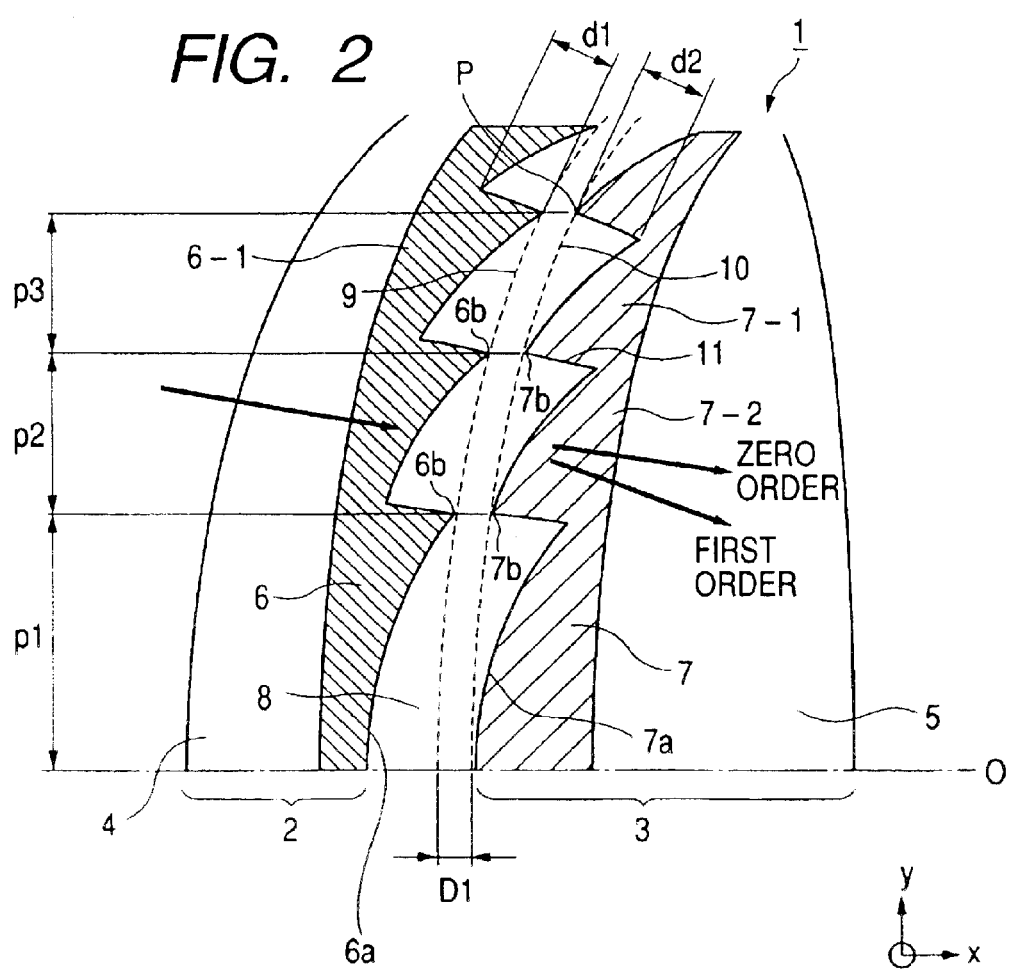
FIG. 2 is a cross-sectional view of the essential portions of a diffraction grating in Embodiment 1 of the present invention.
Figure 6:
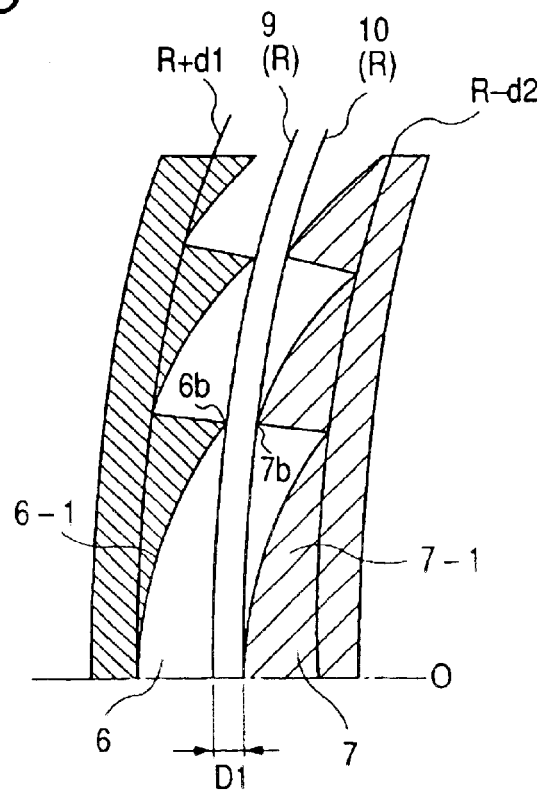
FIG. 6 is an illustration of the curved surface shape of the tip of a diffraction grating.

FIG. 1 is a front view and a side view of the essential portions of the diffraction optical element of the present invention, and FIGS. 2 and 6 are partial cross-sectional views of the element 1 of FIG. 1 along the line 2—2 of FIG. 1.

Referring to FIG. 1, reference numeral 1 designates a diffraction optical element comprising the diffraction grating 6 of a first diffraction optical element 2 and the diffraction grating 7 of a second diffraction optical element 3 which are proximate and opposed to each other. The diffraction gratings 6 and 7 constituting the diffraction optical element 1 comprise concentric circular grating shapes and have lens action. Also, the two adjacent diffraction gratings 6 and 7 provide curved surfaces (curved tip planes) 9 and 10 when the tips 6b (7b) of grating portions 6-1 (7-1) are ranged. The two curved tip planes 9 and 10 are of equal curved surface shapes. O denotes an optical axis.

FIG. 2 is a view of the diffraction gratings 6 and 7 considerably deformed in the direction of depth of the gratings. The diffraction optical element 1 is of a construction in which the first diffraction optical element 2 having the diffraction grating 6 formed on the surface of a substrate 4 and the second diffraction optical element 3 having the diffraction grating 7 formed on the surface of a substrate 5 are proximate to each other with air 8 therebetween. Further, the surfaces of the substrates 4 and 5 on which the diffraction gratings 6 and 7 are formed and the surfaces opposite thereto are curved surfaces, and the substrates 4 and 5 themselves have the action as a refracting lens. In FIG. 2, the reference numerals 9 and 10 designate the curved tip planes of the diffraction gratings 6 and 7.

The diffraction efficiency of the diffraction optical element will first be described.

Figure 16:
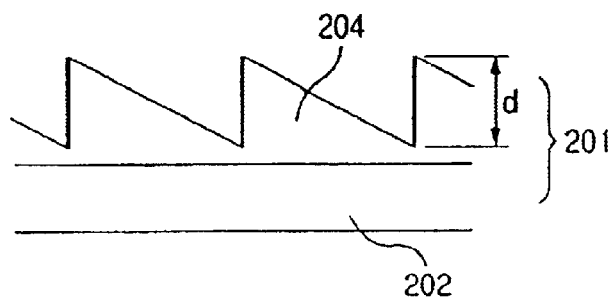
FIG. 16 is an illustration of the grating shape (triangular wave shape) of a diffraction optical element according to the prior art.
Figure 17:
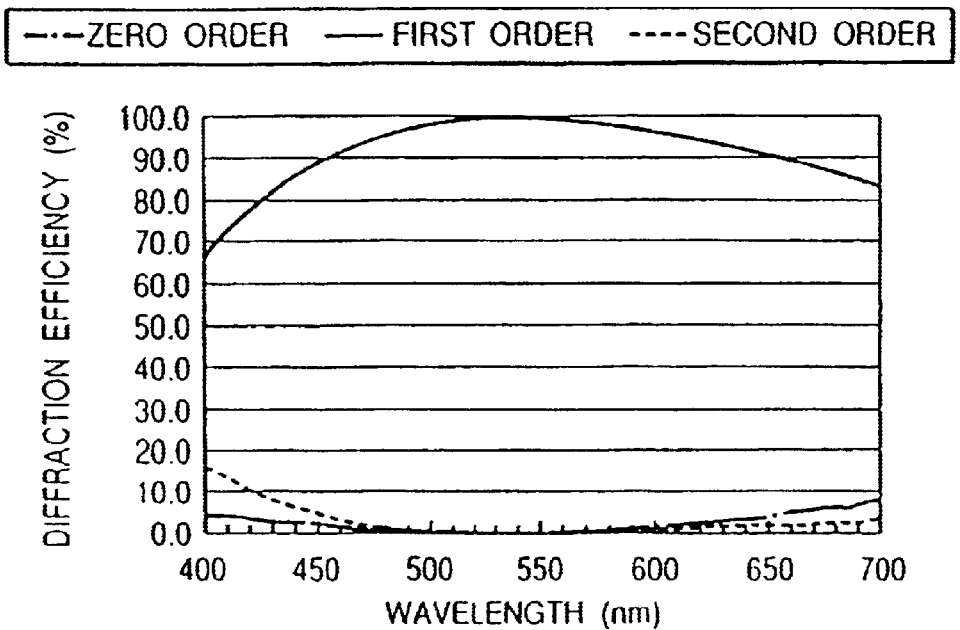
FIG. 17 is an illustration of the diffraction efficiency of the diffraction optical element according to the prior art.
Figure 18:
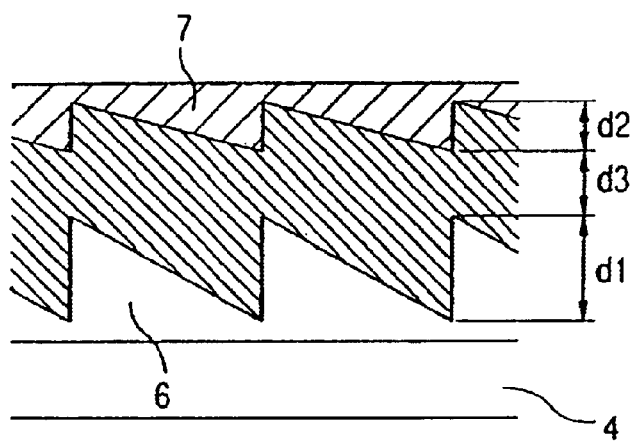
FIG. 18 is an illustration of the cross-sectional shape of the diffraction grating of a laminated type diffraction optical element according to the prior art.
Figure 19:
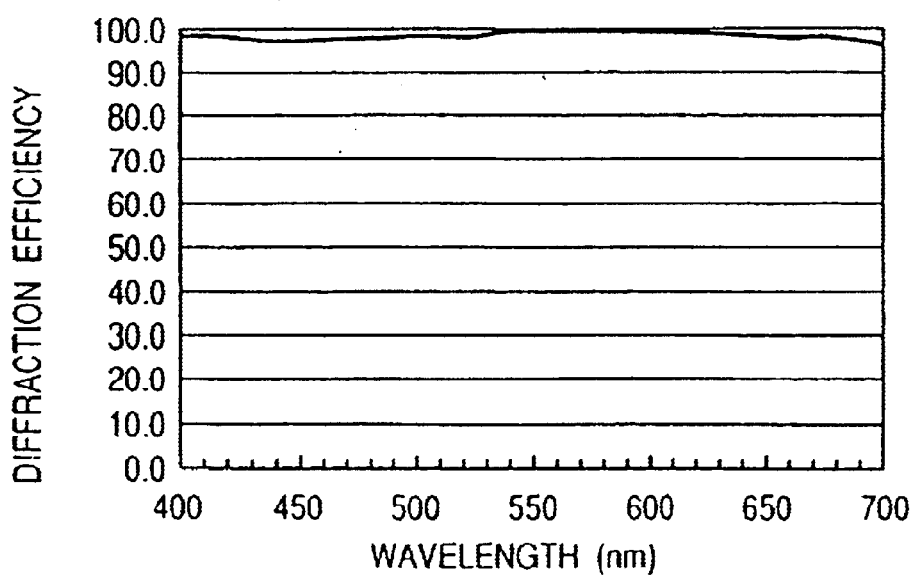
FIG. 19 is an illustration of the diffraction efficiency of the laminated type diffraction optical element according to the prior art.
Figure 20:
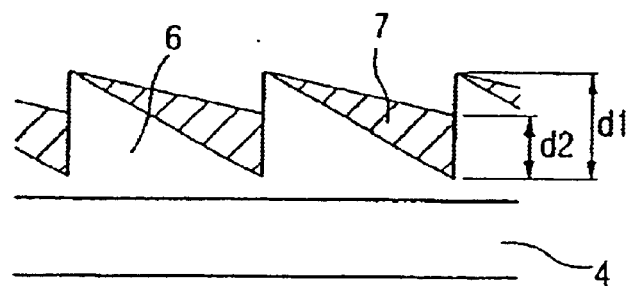
FIG. 20 is an illustration of the cross-sectional shape of the diffraction grating of the laminated type diffraction optical element according to the prior art.

A diffraction optical element 201 of the ordinary transmission type as shown in FIG. 16 has a layer of diffraction grating 204, and the condition under which diffraction efficiency becomes maximum at the design wavelength λ0 is that when a light beam enters a diffraction grating 204 (diffraction surface) perpendicularly thereto, the difference in optical light path difference between the mountain and valley of the diffraction grating 204 becomes integer times as great as the wavelength, and this can be represented by the following expression:

$$(n_{01}-1)d = m\lambda_0, \qquad (1)$$

where $n_{01}$ represents the refractive index of the material of the diffraction grating at a wavelength $\lambda_0$, d represents the thickness of the grating, and m represents the diffraction order. FIG. 17 shows the diffraction efficiency of the diffraction optical element 201 at this time.

Figure 21:
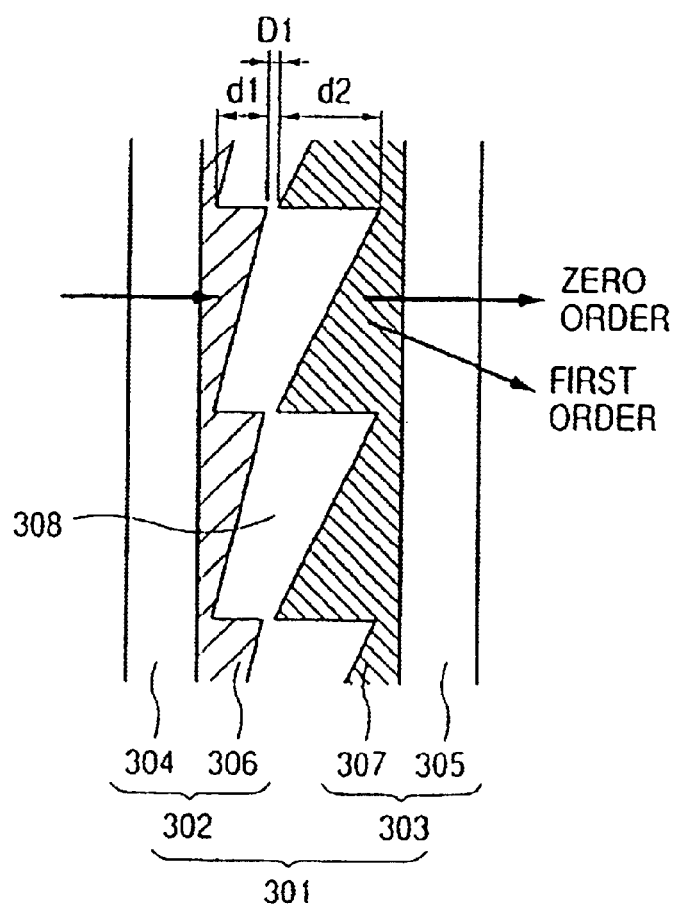
FIG. 21 is an illustration of the cross-sectional shape of a diffraction optical element according to the prior art formed on a flat plate.

On the other hand, a diffraction optical element 301 having two or more layers of diffraction gratings 306, 307 as shown in FIG. 21, in order to make it act as a diffraction grating through all layers, is determined so that the differences in the optical light path length between the mountains and valleys of the diffraction gratings 306, 307 may be found and the total thereof over all layers may be integer times as great as the wavelength. In FIG. 21, the reference numerals 304 and 305 designate substrates, and the reference numeral 308 denotes an air layer. The conditional expression under which the diffraction efficiency when a light beam enters the diffraction optical element 301 of laminated structure shown in FIG. 21 perpendicularly thereto becomes maximum is $$\pm(n_{01}-1)d1 \pm (n_{02}-1)d2 = m\lambda_0, \qquad (2)$$

where $n_{01}$ represents the refractive index of the material of the first diffraction grating 306 at the wavelength $\lambda_0$, $n_{02}$ represents the refractive index of the material of the second diffraction grating 307 at the wavelength $\lambda_0$, and d1 and d2 represent the grating thickness of the first diffraction grating 306 and the second diffraction grating 307, respectively. Here, when the direction of diffraction is made such that the downward diffraction from 0-order diffracted light in FIG. 21 is a positive diffraction order and the upward diffraction from 0-order diffracted light is a negative diffraction order, the signs of increase and decrease in each layer in expression (2) become such that the case of a grating shape (in the figure, the diffraction grating 307) in which as shown, the grating thickness increases from up to down is positive, and the case of a grating shape (in the figure, the diffraction grating 306) in which conversely, the grating thickness increases from down to up is negative. A specific example will hereinafter be cited and described.

First, the following construction is adopted as the first diffraction optical element 302. The material forming the diffraction grating 306 is ultraviolet ray setting resin (nd= 1.635, vd=23.0), and the thickness d1 of the grating is 6.9 μm. Likewise, the following construction is adopted as the second diffraction optical element 303. The material forming the diffraction grating 307 is ultraviolet ray setting resin C001 (nd=1.524, vd ~50.8) produced by Dainippon Ink Chemical Industry Ltd., and the thickness d2 of the grating is 9.5 μm. The diffraction efficiency of the first order diffracted light and zero order and second order in the vicinity thereof in this construction is shown in FIG. 22.

Figure 22:
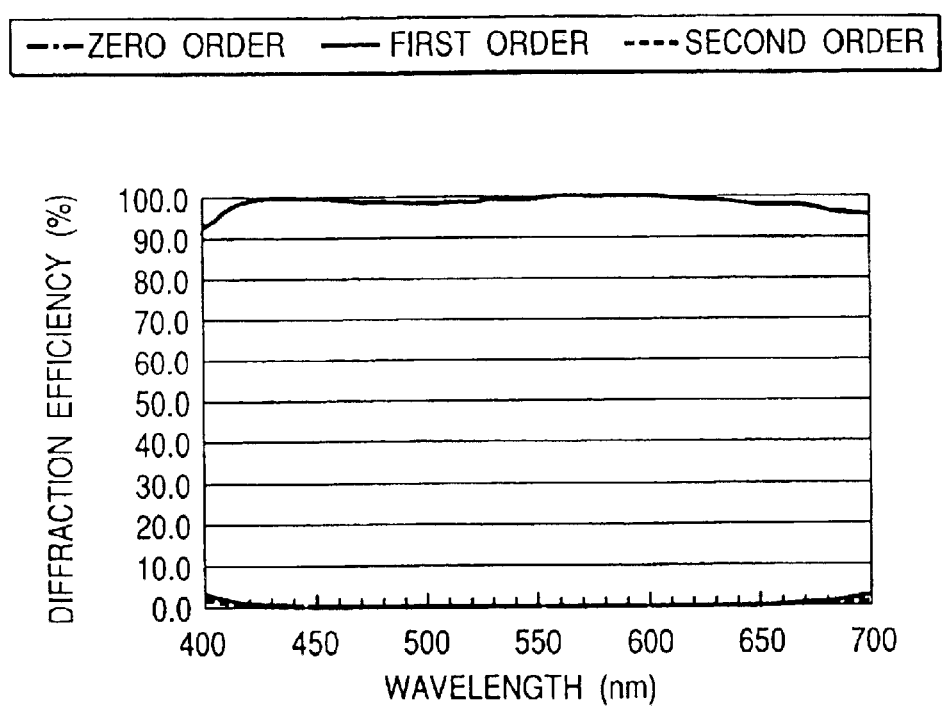
FIG. 22 is an illustration of the diffraction efficiency of the diffraction optical element according to the prior art formed on a flat plate.

As can be seen from FIG. 22, the first order diffracted light maintains high diffraction efficiency in the entire visible range. It can also be seen that the diffraction efficiency of the zero order and second order diffracted lights which are the neighboring orders of the first order diffracted light which is the design order is greatly reduced as compared with the example of the prior art shown in FIG. 17.

Description will now be made of the shape of the diffraction optical element of the present invention having a diffraction grating formed on a curved surface. As the construction, it is to be understood that the above-mentioned diffraction grating is formed on a curved surface having a radius of curvature R (hereinafter referred to as the reference curved surface).

Figure 4:
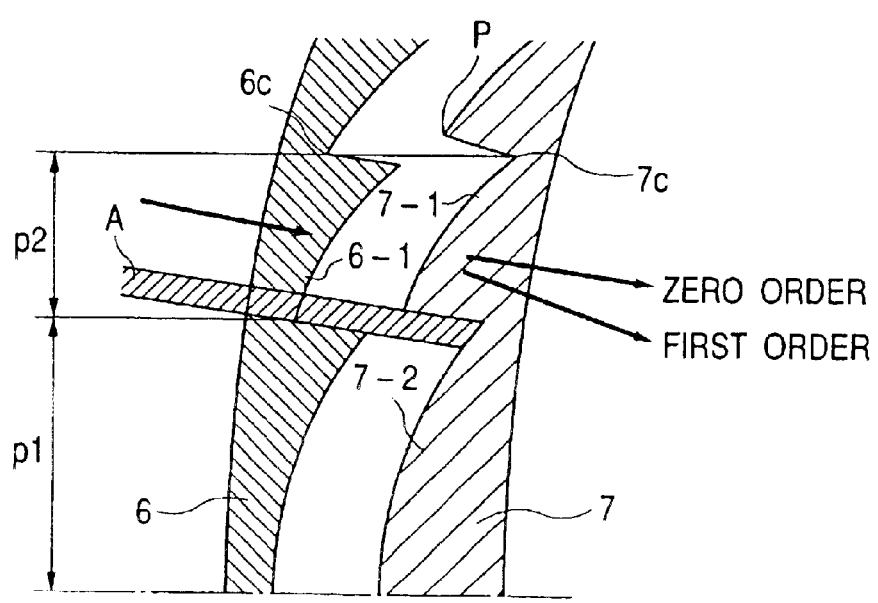
FIG. 4 is an illustration of grating pitch.

Description will first be made of the grating pitches of the diffraction gratings 6 and 7 of the first diffraction optical element 2 and the second diffraction optical element 3, respectively. As regards the grating pitch of the diffraction grating when formed on a curved surface, it is preferable that the grating pitch distributions at the positions of the tips 6b and 7b of those grating portions 6-1 and 7-1 of the diffraction gratings 6 and 7 adjacent to each other which are most proximate become substantially equal to each other. That is, design is made such that a segment linking the tips 6b and 7b of the grating portions 6-1 and 7-1 opposed to each other is substantially parallel to the optical axis O. FIG. 4 shows as a comparative example a diffraction optical element of such a combination in which only the grating pitch distributions at the positions of the tips of the gratings on the substrate side (in FIG. 4, the groove bottoms 6c and 7c of the grating portions of the diffraction gratings 6 and 7) are equal to each other. In the ensuing illustrations, only the diffraction gratings are shown and particularly the substrate is not shown.

In the construction shown in FIG. 4, a light beam propagating through an area represented by hatching A emerges from the grating portion 6-1 of the first diffraction grating 6, whereafter it does not enter a corresponding grating portion 7-1, but enters a grating portion 7-2 adjacent to this grating portion 7-1. Accordingly, the light beam in the area of hatching A cannot obtain a desired optical light path length difference and is not converted into diffracted light of the design order, but becomes unnecessary diffracted light of other order than the design order. Therefore, in the present embodiment, in order to reduce this unnecessary light beam, design is made such that as shown in FIG. 2, the grating pitch distribution at the position P of the tip of the grating most proximate to the grating portion 7-1 of the grating 7 adjacent to the grating portion 6-1 becomes equal to the grating pitch distribution at the position of the tip of the grating portion 6-1.

Description will now be made of the shapes of surfaces (curved tip planes) 9 and 10 in which the tips of the grating portions 6-1 and 7-1 of the diffraction ratings 6 and 7 of the first and second diffraction optical elements 2 and 3, respectively, are ranged.

In the diffraction optical element of FIG. 2, the shapes of the surfaces (curved tip planes) 9 and 10 in which the tips 6b and 7b of the grating portions 6-1 and 7-1 of the two adjacent diffraction gratings 6 and 7, respectively, are ranged are substantially equal to each other.

Figure 5:
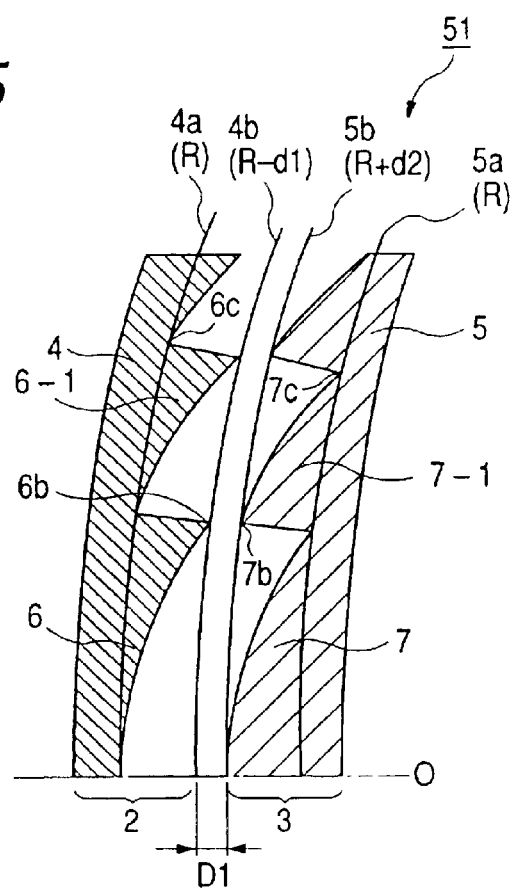
FIG. 5 is an illustration of the curved surface shape of the tip of a diffraction grating.

FIG. 5 shows as a comparative example a diffraction optical element 51 in which the shapes of only curved surfaces 4a and 5a in which the groove bottoms 6c and 7c of grating portions 6-1 and 7-1, respectively, are ranged are equal to each other. Here, a case where diffraction gratings 6 and 7 are formed on curved surfaces 4a and 5a of a radius of curvature R will be described as an example. In this case, the radii of curvature of curved tip planes 4b and 5b in which the tips 6b and 7b of the grating portions 6-1 and 7-1 of the diffraction gratings 6 and 7 are ranged change by an amount corresponding to the thickness of the grating, and the radius of curvature of the curved tip plane 4b of the first diffraction optical element 2 is R−d1, and the radius of curvature of the curved tip plane 5b of the second diffraction optical element 3 is R+d2. The spacing on the optical axis O between the curved tip planes 4b and 5b in which the tips 6b and 7b are ranged is defined as D1.

Here, as a specific numerical value example, the spacing between the diffraction gratings in the peripheral portions thereof when the radius of curvature R is 150 mm and the effective diameter of the gratings is ϕ100 mm and the thickness dl of the grating is 9.5 μm and the thickness d2 of the grating is 6.9 μm and the spacing D1 is 3 μm is about 2.0 μm which is smaller by the order of 1.0 μm as compared with the central portion on the optical axis. This fluctuation of the spacing is an amount which cannot be neglected when it is taken into account that the thickness of the grating is of the order of several μm. Accordingly, in order to eliminate the fluctuation of this grating spacing (the spacing between the tip of a certain grating portion and the tip of another grating portion opposed thereto) depending on the location, in the present embodiment, the shapes of the curved tip planes 9 and 10 in which the tips 6b and 7b of the grating portions 6-1 and 7-1 of the two adjacent diffraction gratings 6 and 7 are ranged are made substantially equal to each other as shown in FIGS. 2 and 6 (in FIG. 6, the both curved tip planes have the same radius of curvature R).

Figure 7:
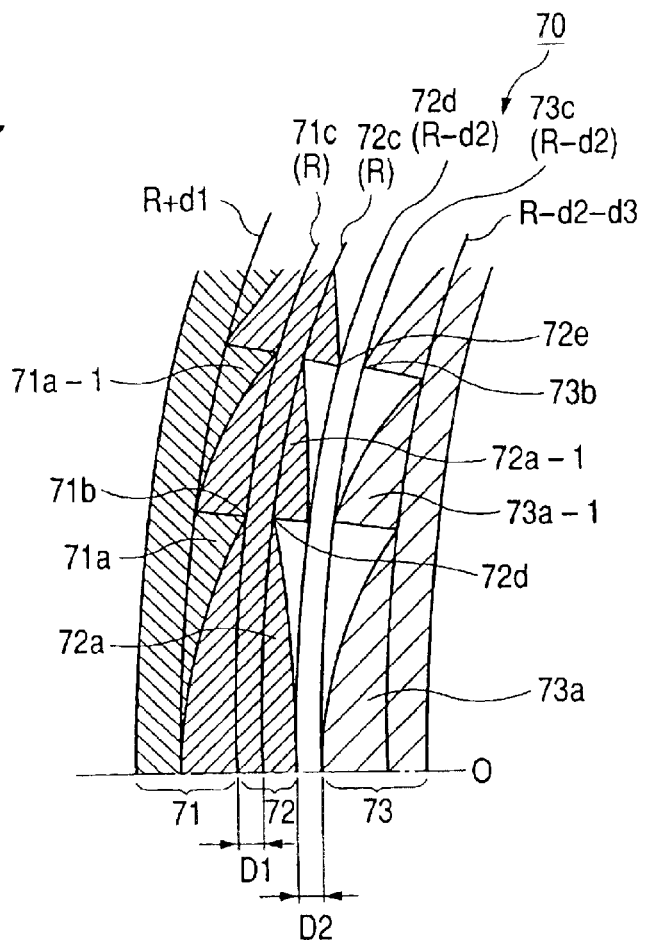
FIG. 7 is an illustration of the curved surface shape of the tip of a diffraction grating.

When as shown in FIG. 7, a diffraction optical element 70 is comprised of first, second and third diffraction optical elements 71, 72 and 73, design is made such that a curved tip plane 71c in which the tips 71b of the grating portions 71a-1 of the diffraction gratings 71a of the element 71 are ranged and a groove bottom curved surface 72c in which the groove bottoms 72d of the grating portions 72a-1 of the diffraction gratings 72a of the element 72 adjacent to the element 71 are ranged are made into curved surfaces (radius of curvature R) equal in radius of curvature to each other. Also, design is made such that curved tip planes 72d and 73c in which the tips 72e and 73b of the grating portions 72a-1 and 73a-1 of the adjacent diffraction gratings 72a and 73a are ranged become curved surfaces (radius of curvature R−d2) equal in radius of curvature to each other. Here, which of the curved surfaces in which the tips of the gratings are ranged should be the reference curved surface is not particularly restricted.

Figure 8:
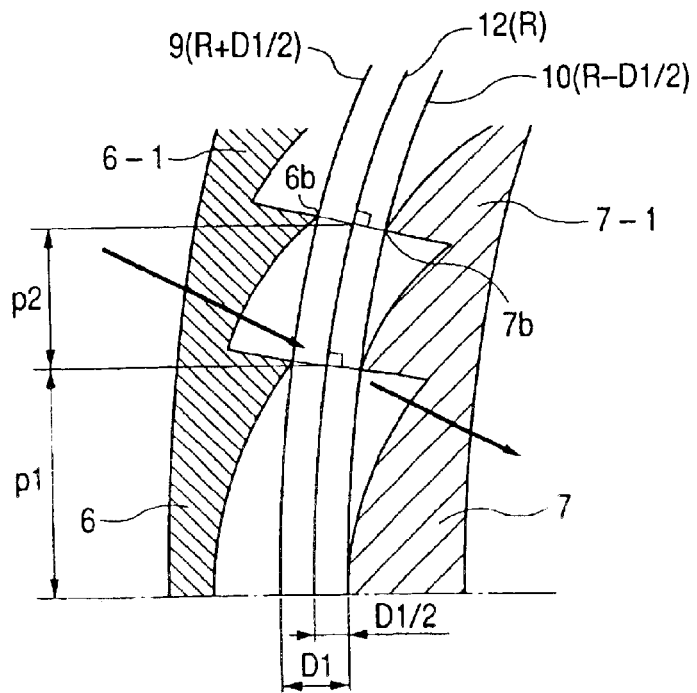
FIG. 8 is an illustration of the grating pitch and curved surface shape of the diffraction grating.

The manner of determining the grating pitches of the diffraction gratings 6 and 7 and the surface shapes of the curved tip planes 9 and 10 thereof when the curved tip planes 9 and 10 in which the tips 6b and 7b of the most proximate grating portions 6-1 and 7-1 of the adjacent diffraction gratings 6 and 7 are ranged are separate from each other by D1 in the direction of the optical axis O will now be described in detail with reference to FIG. 8.

A curved surface 12 having a desired radius of curvature R is imaginarily disposed at the intermediate position of the spacing D1 between the grating tips facing each other. Assuming that the curved tip planes 9 and 10 in which the grating tips 6b and 7b of the grating portions of the diffraction gratings 6 and 7 are ranged are concentric circles, the radius of curvature of the first diffraction grating 6 is defined as R+D½, and the radius of curvature of the second diffraction grating 7 is defined as R−D½.

Next, as regards the grating pitch, the grating edge position (zonal radial position) is determined so as to satisfy a desired diffraction condition on the aforementioned imaginary curved surface R. In the case of the concentric circular diffraction optical elements as shown in FIGS. 1 and 2, a conical surface perpendicularly intersecting with the imaginary curved surface R at this position is generated, and positions at which this conical surface intersects with the curved tip planes 9 and 10 in which the grating tips of the mountain sides of the respective grating portions are ranged are defined as the grating edge positions of the respective diffraction optical elements. This construction is a construction in which the spacing between the grating portions is kept at a constant value D1 in a direction perpendicularly intersecting with the reference curved surface and the grating edge positions of the respective grating portions are made coincident with each other. On the other hand, the construction of the embodiment shown in FIGS. 1 and 2 wherein the proximate grating tips of the two adjacent grating portions 7-1 and 7-2 are of the same grating pitch distribution and the curved tip planes 9 and 10 in which the grating tips of the respective grating portions are ranged are the same curved surfaces is a construction in which the spacing between the grating portions is kept at a constant value D1 in the direction of the optical axis O and the grating edge positions of the respective grating portions are made coincident with each other. Strictly, the construction shown in FIG. 8 is preferable, but when the spacing D1 between the grating portions is as small as 1–3 μm, there is no great difference between the two, and from the ease of manufacture, the construction shown in FIG. 2 is preferable.

Figure 9:
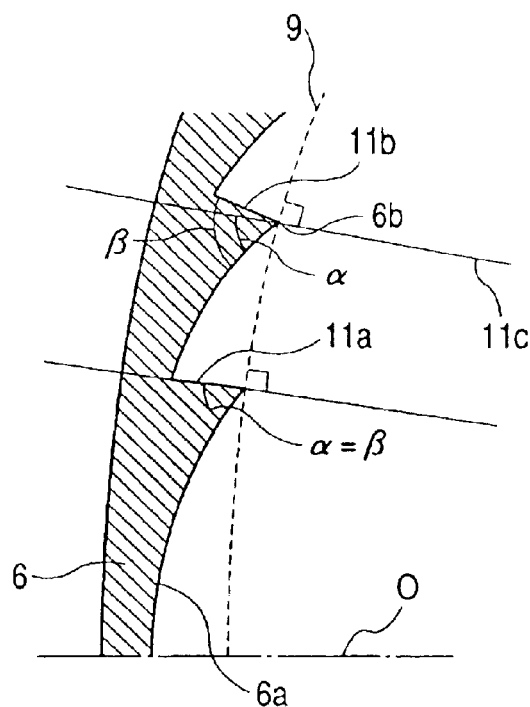
FIG. 9 is an illustration of the grating edge shape.

The edge shape of each diffraction grating will now be described. As shown in FIG. 9, design is made such that the angle β formed by the grating edge portions 11a and 11b with respect to the grating surface 6a becomes the same (the edge portion 11a) as or more obtuse (the edge portion 11b) than the angle α formed between a surface normal 11c at a point whereat the curved tip plane 9 and the grating tip 6b intersect with each other and the grating surface 6a, that is, $\alpha \leq \beta$.

Usually, a diffraction optical element, with the productivity thereof taken into account, is often made by plastic molding or ultraviolet ray setting resin molding by the use of a mold. A molded article having a curved surface shape is generally said to shrink in the direction of a plane perpendicular to the curved surface, and from this, it is preferable to form the grating edge portions 11a and 11b as described previously in order to mold the grating portions with good parting.

The grating thickness d1 (d2) of each diffraction grating will now be described. In the embodiment of the present invention, design is made such that as shown in FIG. 2, a grating thickness projective component in the direction of a surface normal 11c at a position whereat the curved tip planes 9 and 10 in which the tips of the grating portions are ranged and the grating tips 6b and 7b intersect with each other becomes constant. That is, design is made such that the lengths of the grating edge portions 11a and 11b in a direction parallel to the surface normal become constant.

Figure 10:
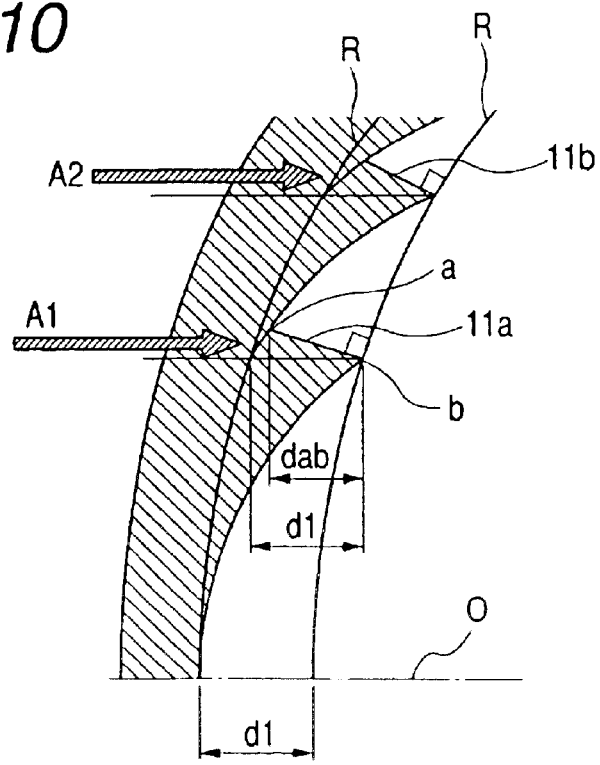
FIG. 10 is an illustration of the thickness of the grating.

FIG. 10 shows as a comparative example the cross-sectional shape of a diffraction grating in which the grating thickness parallel to the optical axis O is constant. The cross-sectional shape shown in FIG. 10 is a grating condition under which there is obtained optimum diffraction efficiency when a light beam entering the diffraction optical element enters substantially in parallelism to the optical axis O. In this case, however, if with the aforedescribed moldability taken into account, the grating edge portions 11a and 11b are formed perpendicularly to the reference curved surface R, those of parallel light beams which are indicated by A1 and A2 enter the grating edge portions 11a and 11b, and become unnecessary light beams which are not diffracted in a desired direction of diffraction. Accordingly, to reduce the influence of these unnecessary diffracted lights, it is preferable to use the diffraction optical element so that the light beams may enter the reference curved surface substantially perpendicularly thereto. At this time, the phase difference the diffraction optical element gives to the incident light beams is given from the difference in the length of the optical light path through which the light beams pass.

It is apparent from this that in FIG. 10, the length (ab) of the edge portion 11a in the direction of the optical axis O becomes the grating thickness dab and this is a small grating thickness as compared with the desired grating thickness d1. Therefore, as in the embodiment of the present invention shown in FIG. 2, design is made such that the grating thickness component in the direction of the surface normal 11c of the curved surfaces 9 and 10 at a position whereat the curved tip planes 9 and 10 in which the tips of the grating portions are ranged and the tips of the grating portions intersect with each other becomes constant, whereby optimum diffraction efficiency is obtained in the use of a diffraction optical element in which the influence of the grating edges is small.

Figure 3:
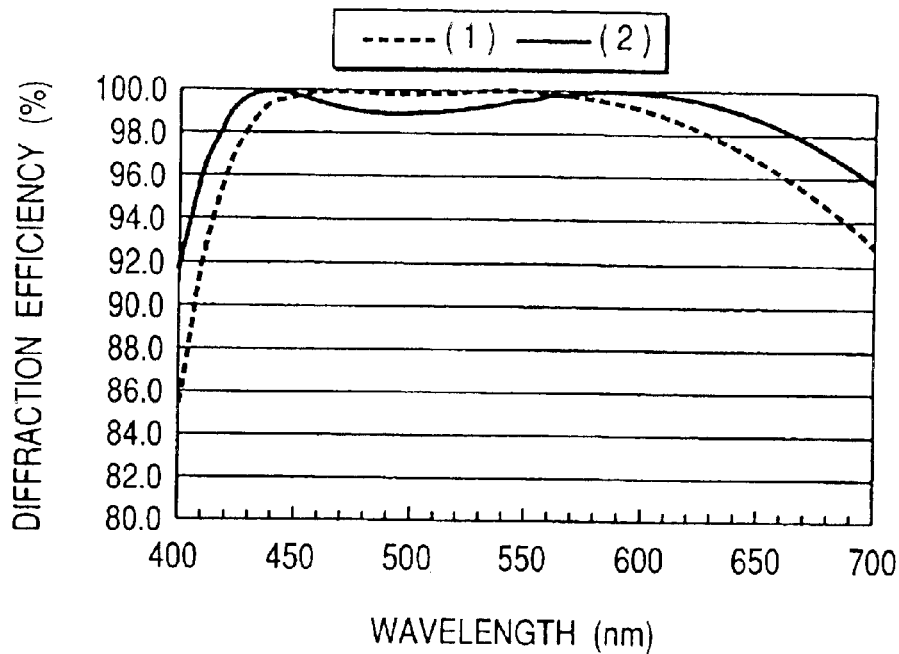
FIG. 3 is an illustration of the diffraction efficiency of the diffraction optical element according to Embodiment 1 of the present invention.

FIG. 3 shows the diffraction efficiency of the diffracted light of the design order of the light beam which has entered the diffraction optical element of the embodiment of the present invention from the direction of a perpendicular to the curved tip planes, and the diffraction efficiency of the diffracted light of the design order of the light beam which has entered the diffraction optical element shown in FIG. 10 from the direction of the optical axis O. It is to be understood here that the grating pitch is 70 μm, the angle formed by and between the surface normal of the reference curved surface and the optical axis is 5°, the material of the diffraction grating 6 of the first diffraction optical element 2 is ultraviolet ray setting resin (nd ~1.635, vd=23.0), and the material of the diffraction grating 7 of the second diffraction optical element 3 is ultraviolet ray setting resin C001 (nd=1.524, vd=50.8) produced by Dainippon Chemical Industry Ltd. It is also to be understood that in the respective constructions, the grating thickness dl satisfies 6.9 μm and the grating thickness d2 satisfies 9.5 μm. In FIG. 3, solid line (2) indicates the diffraction optical element of the embodiment of the present invention, and dotted line (1) indicates the diffraction optical element of the construction of FIG. 10.

It will be seen from FIG. 3 that the diffraction efficiency of the diffraction optical element of the embodiment of the present invention is high and moreover, performance equal to that of the diffraction optical element of laminated structure formed on a flat surface which is shown in FIG. 22 is obtained.

Figure 11:
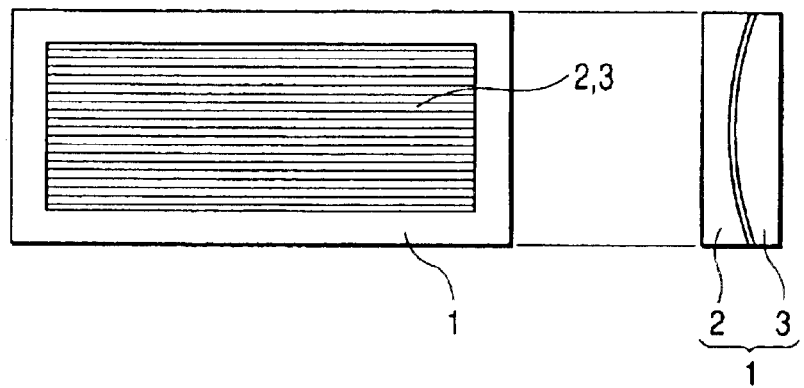
FIG. 11 is an illustration of a one-dimensional diffraction optical element according to Embodiment 1 of the present invention.

While the foregoing description has been made of a diffraction optical element in which the curved tip planes are spherical surfaces, the present invention can also be applied to a diffraction optical element in which the curved tip planes are any curved surfaces such as aspherical surfaces, cylindrical surfaces or toric surfaces. The present invention can also be applied to a diffraction optical element having a one-dimensional grating (diffraction grating of equal pitch) as shown in FIG. 11, besides a diffraction optical element having a diffraction grating of which the grating pitch changes gradually.

Figure 12:
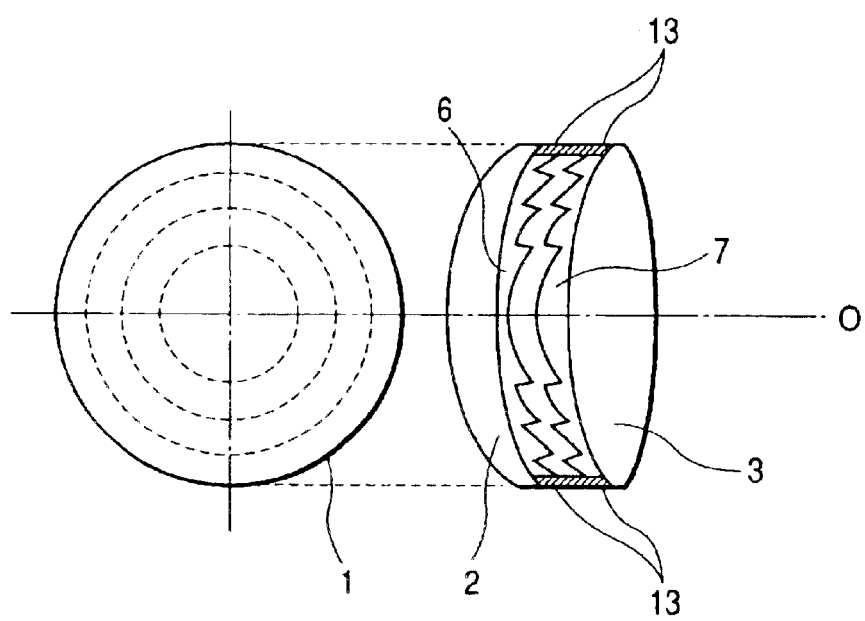
FIG. 12 is a schematic view of the essential portions of a diffraction optical element according to Embodiment 2 of the present invention.

FIG. 12 is a schematic view of the essential portions of Embodiment 2 of the diffraction optical element of the present invention.

The aforedescribed Embodiment 1 has been of a construction in which the first and second diffraction optical elements are disposed in proximity to each other. Here, it is necessary that the relative positions of the two diffraction optical elements be considerably accurately adjusted to each other. So, Embodiment 2 adopts a construction as shown in FIG. 12 wherein two diffraction optical elements 2 and 3 are adhesively secured to each other in a non-grating area 13 in which the diffraction gratings of the diffraction optical elements 2 and 3 are absent.

By adopting such a construction, the adherence of dust to the surfaces of the gratings can be greatly reduced if the elements are assembled up to the adhesive securing in an environment such as a clean room wherein little dust is present. Also, after the adhesive securing, the surfaces of the gratings are not touched and therefore, the working property when the diffraction optical element 1 is incorporated into other optical system is greatly improved.

Figure 13:
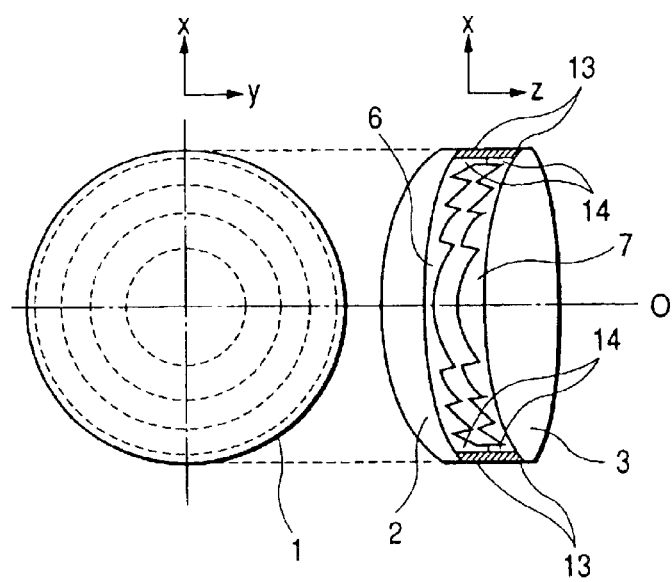
FIG. 13 is a schematic view of the essential portions of a diffraction optical element according to Embodiment 3 of the present invention.

FIG. 13 is a schematic view of the essential portions of Embodiment 3 of the diffraction optical element of the present invention.

The diffraction optical elements of the aforedescribed Embodiments 1 and 2 are of a construction in which two diffraction gratings are disposed in proximity to each other. In Embodiment 2, the relative position between the two diffraction gratings may three-dimensionally cause an error. So, in Embodiment 3, as shown in FIG. 13, portions 14 for regulating the spacing between the grating portions in the direction of height thereof are provided in non-grating areas 13, whereby the relative spacing between the grating portions in the direction of depth thereof is provided with good accuracy.

By such a construction, the alignment of the diffraction gratings may be accomplished by effecting the alignment only in xy directions and the working property is greatly improved. Also, the problem that during alignment, the diffraction gratings interfere with each other and the tips of the gratings are deformed is eliminated. If the portions 14 for regulating the height of the grating portions in the present embodiment are integrally formed of the same material as the material of the diffraction gratings 6 and 7 when the diffraction gratings 6 and 7 are prepared, it will be preferable in both of accuracy and cost. Further, when as shown in FIGS. 1, 12 and 13, the substrate has a lens shape, if such adjustment that the relative eccentricity of two lenses is offset is carried out during alignment adjustment, there can be provided a diffraction optical element of good performance in which transmission optical eccentricity is little.

Embodiment 4 of the diffraction optical element of the present invention will now be described.

While in the diffraction optical elements of the aforedescribed embodiments, the materials forming the substrate and the diffraction gratings differ from each other, this is not restrictive, but the material forming the diffraction gratings may be the same as the material of the substrate and the diffraction gratings may be manufactured integrally with the substrate.

By adopting such a construction, the outer diameter of the substrate and the positions of the centers of the diffraction gratings can be adjusted with good accuracy. Or when the substrate has a lens shape, it becomes possible to adjust the core of the substrate lens and the centers of the gratings well. Accordingly, the optical axis adjusting accuracy when the diffraction optical element of the present invention is incorporated into other lens is improved, and the deterioration of an aberration such as imaging performance caused by the element becoming eccentric can be greatly reduced.

Figure 14:
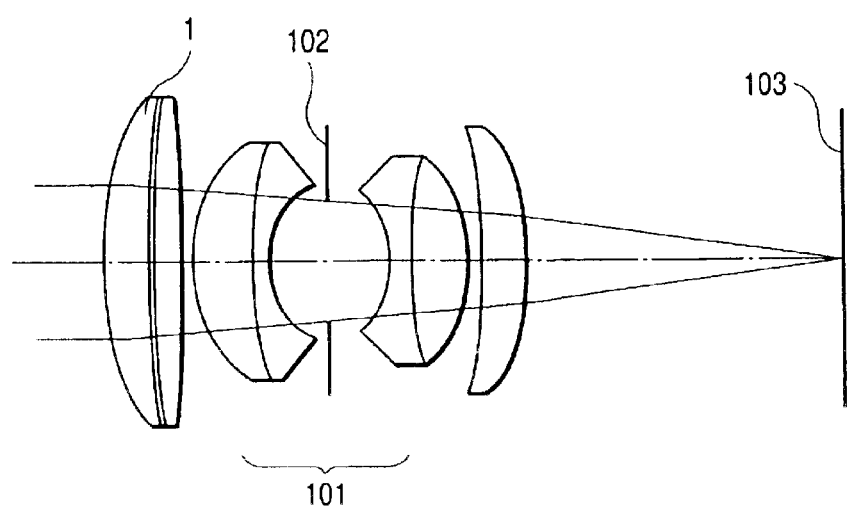
FIG. 14 shows a photo-taking optical system according to Embodiment 4 of the present invention.

FIG. 14 is a schematic view of the essential portions of an optical system using the diffraction optical element according to the present invention.

FIG. 14 shows a cross-section of the photo-taking optical system of a camera or the like, and in FIG. 14, the reference numeral 101 designates a photo-taking lens having a stop 102 and one of the aforedescribed several diffraction optical elements 1 therein. The reference numeral 103 denotes film or a CCD which is an imaging surface.

By using the diffraction optical element according to the present invention, the wavelength dependency of diffraction efficiency is greatly improved and therefore, there can be obtained a photo-taking lens of high performance in which flare is little and the resolving power at low frequencies is high. Also, this diffraction optical element can be prepared by a simple manufacturing method and therefore, an inexpensive optical system excellent in mass productivity as a photo-taking optical system can be provided.

While in FIG. 14, the diffraction optical element 1 of the present invention is provided on the cemented surface of the fore lens, this is not restrictive, but the element 1 may be provided on the surface of the lens, or a plurality of diffraction optical elements according to the present invention may be used in the photo-taking lens.

Also, in the present embodiment, there has been shown the case of the photo-taking lens of a camera, whereas this is not restrictive, but the diffraction optical element of the present invention can also be used in various imaging optical systems used in a wide wavelength range, such as the photo-taking lens of a video camera, the image scanner of a business machine and the reader lens of a digital copier to thereby obtain a similar effect.

Figure 15:
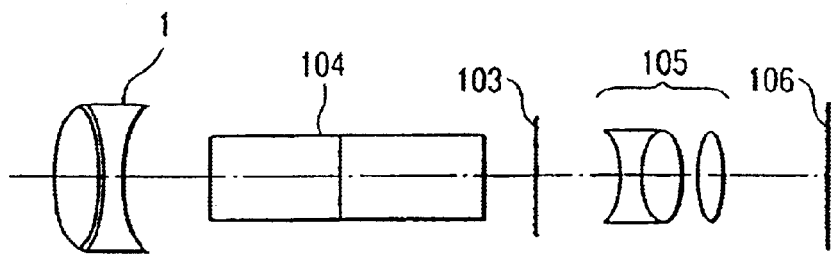
FIG. 15 shows an observation optical system according to Embodiment 5 of the present invention.

FIG. 15 is a schematic view of the essential portions of an optical system using the diffraction optical element according to the present invention.

FIG. 15 shows a cross-section of the observation optical system of binoculars or the like, and in FIG. 15, the reference numeral 1 designates an objective lens including one of the diffraction optical elements of the aforedescribed embodiments, and the reference numeral 104 denotes image reversing means such as a poroprism for forming an image, and in FIG. 15, it is shown as a glass block for the sake of simplicity. The reference numeral 105 designates an eyepiece, and the reference numeral 106 denotes an evaluation plane (pupil plane). The diffraction optical element 1 is formed with a view to correct the chromatic aberration or the like on the imaging plane 103 of the objective lens.

By using the diffraction optical element according to the present invention, the wavelength dependency of diffraction efficiency is greatly improved and therefore, there can be obtained an objective lens of high performance in which flare is little and the resolving power at low frequencies is high. Also, the diffraction optical element of the present invention can be prepared by a simple manufacturing method and therefore, there can be provided an inexpensive optical system excellent in mass productivity as an observation optical system.

While in the present embodiment, there has been shown a case where the diffraction optical element is formed on the objective lens portion, this is not restrictive, but a similar effect may be obtained even if the diffraction optical element is formed on the surface of the prism or at a position in the eyepiece. However, by the diffraction optical element being provided more adjacent to the object side than the imaging plane, there is the chromatic aberration reducing effect by only the objective lens and therefore, in the case of an observation system for the naked eye, it is desirable to provide the diffraction optical element at least on the objective lens side.

Also, the optical system of the present embodiment has been shown as binoculars, whereas this is not restrictive, but it may be an optical system such as a ground telescope or an astronomical telescope, and the present invention can also be applied to an optical system such as the optical type finder of a lens shutter camera, a video camera or the like to thereby obtain an effect similar to that in the case of binoculars.

What is claimed is:

1. A diffraction optical element in which a plurality of diffraction gratings formed of at least two kinds of materials having different dispersions are laminated, comprising:
    a first diffraction grating wherein an imaginary surface including tips of grating portions of said first diffraction grating is a curved surface; and
    a second diffraction grating arranged with an air layer between said first diffraction grating and said second diffraction grating, wherein an imaginary surface including tips of grating portions of said second diffraction grating is a curved surface,
    wherein the pitches at positions of tips of corresponding grating portions of said first and second diffraction gratings are equal over the area of use.

2. A diffraction optical element according to claim 1, wherein substrates on which said diffraction gratings are formed are joined together in a non-grating area of each of said diffraction gratings.

3. A diffraction optical element according to claim 1, wherein at least one of said laminated diffraction gratings has at least one diffraction grating differing from it in the direction of the grating shape of the grating portion.

4. A diffraction optical element according to claim 1, wherein a wavelength area used is a visible range.

5. A diffraction optical element according to claim 1, wherein at least one of said plurality of diffraction gratings is such that the material forming said diffraction gratings is the same as the material forming a substrate on which said diffraction gratings are provided.

6. A diffraction optical element according to claim 5, wherein said substrate has lens action.

7. A diffraction optical element according to claim 1, which is formed on a cemented surface of a cemented lens.

8. A diffraction optical element according to claim 1, wherein said plurality of diffraction gratings are laminated so that the diffraction efficiency of a particular order may heighten in an entire wavelength area used.

9. An optical system using the diffraction optical element according to claim 1.

10. An optical system according to claim 9, which is an imaging optical system.

11. An optical system according to claim 9, which is an observation optical system.

* * * * *

UNITED STATES PATENT AND TRADEMARK OFFICE
CERTIFICATE OF CORRECTION

PATENT NO.    : 6,829,093 B1
DATED         : December 7, 2004
INVENTOR(S)   : Takehiko Nakai It is certified that error appears in the above-identified patent and that said Letters Patent is hereby corrected as shown below:

Column 6,
Line 18, "wavelength λ0" should read -- wavelength $\lambda_0$ --.

Column 7,
Line 6, "vd ~ 50.8)" should read -- vd = 50.8) --;
Line 63, "ratings 6" should read -- gratings 6 --.

Column 9,
Line 6, "R + D½" should read -- R + D1/2 --;
Line 7, "R - D½" should read -- R - D1/2 --; and
Line 36, "from" should read -- for --.

Column 10,
Line 46, "(nd ~ 1.635," should read -- (nd = 1.635, --.

Signed and Sealed this

Twenty-fourth Day of May, 2005

JON W. DUDAS
*Director of the United States Patent and Trademark Office*